United States Patent
Fischer et al.

(10) Patent No.: US 7,096,095 B2
(45) Date of Patent: Aug. 22, 2006

(54) METHOD FOR THE FUEL-OPTIMIZED SELECTION OF A THRUSTER CONFIGURATION

(75) Inventors: Horst-Dieter Fischer, Unterhaching (DE); Joachim Chemnitz, München (DE)

(73) Assignee: EADS Astrium GmbH, Munich (DE)

( * ) Notice: Subject to any disclaimer, the term of this patent is extended or adjusted under 35 U.S.C. 154(b) by 83 days.

(21) Appl. No.: 10/635,616

(22) Filed: Aug. 7, 2003

(65) Prior Publication Data
US 2005/0080521 A1 Apr. 14, 2005

(30) Foreign Application Priority Data
Aug. 8, 2002 (DE) ................................ 102 36 570

(51) Int. Cl.
*G05D 1/00* (2006.01)
(52) U.S. Cl. .......................................... 701/13; 701/226
(58) Field of Classification Search ................ 701/3, 701/4, 13, 99, 226; 244/158 R, 164, 165, 244/169, 170, 171, 172
See application file for complete search history.

(56) References Cited

U.S. PATENT DOCUMENTS

| | | | |
|---|---|---|---|
| 5,130,931 A | | 7/1992 | Paluszek et al. |
| 5,195,172 A | * | 3/1993 | Elad et al. .................. 706/62 |
| 5,310,143 A | | 5/1994 | Yocum et al. |
| 5,428,712 A | * | 6/1995 | Elad et al. .................. 706/46 |
| 6,208,915 B1 | * | 3/2001 | Schutte et al. .............. 701/13 |
| 6,347,262 B1 | | 2/2002 | Smay et al. |
| 6,823,675 B1 | * | 11/2004 | Brunell et al. .............. 60/773 |

FOREIGN PATENT DOCUMENTS

| | | |
|---|---|---|
| EP | 0 750 239 A2 | 12/1996 |
| EP | 0750239 A2 | 12/1996 |
| EP | 0977687 B1 | 5/2001 |
| WO | WO 98/49058 | 11/1998 |

OTHER PUBLICATIONS

N. Karmarkar, "A N ew Polynomial-Time Algorithm f or Linear Programming" *Combinatorica* 4(4) (1984) pp. 373-395.
Chapman et al., "Drag-Free Control Analysis and Algorithm Design For The STEP Mission", 5th ESA International Conference On Spacecraft Guidance, Navigation and Control Systems, 'Online! Oct. 22, 2002, XP-002348236.
Karmarkar, "A New Polynomial-Time Algorithm For Linear Programming", Combinatorica, (4) (1984) pp. 373-395, XP-00747276.
Bronstein et al., "Lineare Optimierung", Taschenbuch Der Mathematick, 1989, pp. 695-717, XP002070357.
European Search Report dated Oct. 7, 2005 w/English translation of relevant portion (pp. 4).

* cited by examiner

*Primary Examiner*—Richard M. Camby
(74) *Attorney, Agent, or Firm*—Crowell & Moring LLP

(57) ABSTRACT

The invention describes a method for the fuel-optimized selection of a configuration of thrusters on a spacecraft while resolving a linear optimization problem with an initialization phase for finding a first permissible solution and a subsequent iteration phase, in which proceeding on the permissible solution an iterative optimization of an efficiency criterion takes place. In each iteration step a scaled iteration gradient is formed, and the iteration gradient is multiplied with a limiting factor for a maximum iteration step width, which is formed while taking at least one boundary value condition for a permissible solution into account.

24 Claims, 1 Drawing Sheet

METHOD FOR THE FUEL-OPTIMIZED SELECTION OF A THRUSTER CONFIGURATION

CROSS-REFERENCE TO RELATED APPLICATIONS

This application claims priority to German Patent Application No. 102 36 570.9, which was filed Aug. 8, 2002.

FIELD OF THE INVENTION

The present invention relates to a method for the fuel-optimized selection of a configuration of thrusters on a spacecraft.

BACKGROUND OF THE INVENTION

Such a method of fuel optimized selection is known for example from U.S. Pat. No. 6,347,262 B1 for the case of a spin-stabilized spacecraft. A configuration of thrusters on a spacecraft, as considered by the present invention, serves in particular the attitude and position correction of the spacecraft. Such an attitude and position correction via the thrusters is known for example from EP 0 750239 A2.

From EP 0 977 687 we know of a special method for the low-fuel control of an arrangement of thrusters on a spacecraft, wherein for the purpose of finding a low-fuel solution for the control of a convex linear optimization problem is resolved through
  an initialization phase for finding a first permissible solution to the linear optimization problem and
  a subsequent iteration phase, in which, proceeding on the permissible solution to the linear optimization problem, an iterative optimization of an effectiveness criterion takes place.

In this method a dual simplex algorithm is applied, which is supposed to find an optimal solution to the problem through a largely unfocused search method, wherein however it is possible with this method that there is no solution for the currently existing force-momental vector and the present thruster arrangement.

From N. Karmakar: A new polynominal time algorithm for linear programming, Combinatorica 4 (4), 1984, p. 373–395 we know of a basic method for solving linear optimization problems of a general form.

SUMMARY OF THE INVENTION

It is an object of the present invention to offer a method for the fuel-optimized selection of a configuration of thrusters on a spacecraft, which permits a focused search of a solution to the linear optimization problem that is permissible in any case. This object is achieved through the features described herein.

The present invention relates to a method for the fuel-optimized selection of a configuration of thrusters on a spacecraft, wherein for the purpose of finding a fuel-optimized solution for the selection process a linear optimization problem, particularly a convex linear optimization problem, is resolved, through
  an initialization phase for finding a first permissible solution to the linear optimization problem and
  a subsequent iteration phase, in which proceeding on the permissible solution to the linear optimization problem an iterative optimization of an effectiveness criterion occurs.

Pursuant to the invention it is provided that
  in each iteration step a scaled iteration gradient is formed and
  the iteration gradient is multiplied with a limiting factor for a maximum iteration threshold, which is formed while taking at least one boundary value condition for a permissible solution into account.

By applying a scaled iteration gradient, instead of a mere search method as in the state of the art, a focused locating process for the optimal solution can take place. When forming the scaled iteration gradient, at least one boundary value condition for a permissible solution may be included. Application of a scaled iteration gradient also largely excludes the circumstance when only a suboptimal solution to the linear optimization problem is found. The fact that linear problems can involve, in particular, a so-called convex problem is basically known, see, for example, the chapter "Linear Programming" at the following internet link of the European Business School of the Schloss Reichartshausen University:

http://www.ebs.de/Lehrstuehle/Wirtschaftsinformatik/NEW/Courses/Semester2/Math2/.

By taking the boundary value conditions into account within the framework of the limiting factor, the next iteration solution may be determined. This solution is within a permissible range of values, because the limiting factor allows the iteration step width to be adjusted accordingly so that a boundary value condition is not violated. With a possible consideration of the boundary value conditions within the framework of forming the scaled iteration gradient, the gradient direction may be selected such that a solution that is within a permissible range of values is determined as the next iteration solution.

Furthermore, for the present linear optimization problems it is known that the optimal permissible solution, which corresponds to a coordinate point in a multidimensional space of all permissible solutions that is limited by boundary conditions, is located on the boundary of said limited space. In this manner, the scaled iteration gradient and the limiting factor are preferably adjusted such that an iterative approximation of an optimal point on the delimitation of the multidimensional space of the permissible solutions occurs.

It may now be provided in particular that an upper bound for a permissible solution is defined as a boundary value condition.

Moreover it may be advantageously provided that the iteration gradient is determined with the help of a Gauss elimination, which represents a very fast method.

It may also be provided in particular that in every iteration step a scaling of the iteration gradient takes place such that a gradient component becomes smaller the closer the corresponding component of the result of the previous iteration step comes to a boundary value condition. In this way, a new scaling operation of the iteration gradient is performed in every iteration step, wherein certain components of the gradient disappear when the corresponding components of the previous iteration solution come very close to a boundary value condition, for example, they become smaller than a first pre-defined distance. Said first distance can also be selected to be infinitesimally small.

Furthermore it may be provided that the iteration phase is terminated as soon as the result of an iteration step exceeds at least one boundary value condition and that the result of the previous iteration step is determined as an optimal solution of the effectiveness criterion. Thus the iteration is terminated if the algorithm leaves the range of permissible solutions, and the last permissible solution is determined as the optimal solution. In this way it is guaranteed in a simple manner that in any case the solution that is determined as the final result of the method is as optimal as possible and is simultaneously permissible.

The iteration phase, however, may also be terminated as soon as the iteration method converges against a permissible solution and the result of a certain iteration step differs from the result of a previous iteration step by less than a second predefined distance, wherein the result of the last iteration step is determined as an optimal solution of the effectiveness criterion.

DETAILED DESCRIPTION OF THE INVENTION

Figure 1:
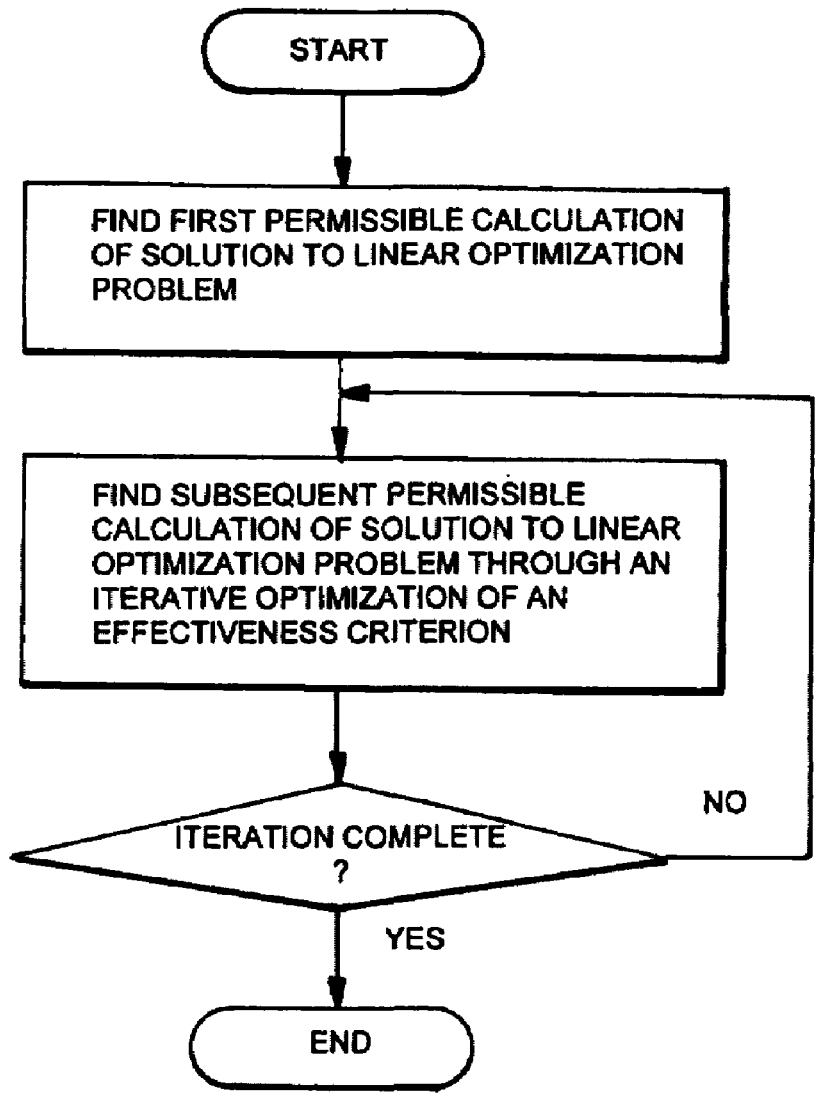
FIG. 1 illustrates a flowchart for a preferred embodiment of the invention.

A preferred embodiment of the present invention is presented herein. See also FIG. 1.

A method for the fuel-optimized selection of an arrangement of thrusters on a spacecraft is considered, which is used for attitude and position control of the spacecraft. In order to generate forces and moments that are applied on a spacecraft, for examples in order to be able to govern translation and rotation simultaneously during a docking phase or any other attitude and position control, $n \geq 7$ thrusters are required. The appropriate control signals must then meet the requirements of being positive of being smaller than a maximum value (in general equal 1).

Furthermore, with more than 7 thrusters an effectiveness criterion, which corresponds in general to fuel consumption, may be optimized.

The mathematical formulation thus leads to the following linear optimization problem (LOP):

Searching thruster control $a$, for which the following applies:

(a) $0 \leq a \leq f$ (b) $T_c a = r$  dim $T_c = 6 \times n$, (1) so that the following effectiveness criterion is met:

c) $\Sigma g_i a_i = g^T a \to$ min wherein $a$: control vector $f$: vector that contains the maximum values of $a_i$ $g$: vector of the weight factors $T_C = \left( \dfrac{f_1, \ldots, f_n}{t_{c1}, \ldots, t_{cn}} \right)$: weight and momental matrix $r$: vector that contains the required forces and moments.

To apply all LOP solution methods, one permissible solution must be found in an initialization phase, i.e., a vector $a_z$, which fulfills (1a) and (1b). With the so-called singular value decomposition (abbreviated SVD) of $T_c$ $T_c = V \Sigma U_1^T$ with $\left. \begin{array}{l} V: \\ U = (U_1, U_2): \end{array} \right\}$ orthogonal matrix $\to T_c U_2 = 0$ $\Sigma = \text{diag } \sigma I > 0$: diagonal matrix of the singular values all solutions of (1b) can be described as $a_0 = U_1 \Sigma^{-1} V^T r + U_2 c$ (2) $=: U_1 s + v$ (2) reveals the following:

(i) to realize random forces and moments all ($\sigma I$) must be greater than zero, i.e., $T_c$ must have full rank (ii) the first addend is completely determined by r and represents the solution with minimal norm of (1b)

(iii) the second addend with the vector c that still has to be determined serves to fulfill the boundary condition (1a) and to minimize (1c)

From the fact that with the thruster set it must be possible to realize both positive and negative r, it results from (2) that $c_1$ and $c_2$ must exist so that (a) $a_1 := U_1 s_1 + U_2 c_1 \geq 0$ (b) $a_2 := U_1(-s_1) + U_2 c_2 \geq 0$  (3)

(c) $\to U_2(c_1 + c_2) =: U_2 c_p > 0$ i.e., the existence of a random number of vectors $c_p$ with $v_p = U_2 c_p > 0$  (4)

is guaranteed. After selecting a certain (a priori fixed) $v_p$, $a_0$ may be made positive pursuant to (5)
(a) $a_0 = U_1 s + v_p k_1 \geq 0$, (b) $k_1 = \max_i \dfrac{(-U_1 s)i + \varepsilon}{v p_i}, \varepsilon \approx 0.04 > 0$ wherein $\varepsilon$ for numerical reasons was introduced for application of the following optimization steps.

For large right sides r it is possible that (1a, b) has no solution $a \leq f$, therefore the problem that is expanded by $x_s$ is considered (6)
(a) $T_c a = r(1 - x_s)$,  (b) $\begin{array}{l} 0 \leq a \leq f \\ 0 \leq x_s \leq 1 \end{array}$ (c) $\to (T_c, r) \begin{pmatrix} a \\ x_s \end{pmatrix} = r$ (d) $g^T a + g_s x_s \to$ min (e) $g_s \geq g^T f$, so that $x_s$ becomes zero if $r$ is not too large This now also allows the upper bound to be adhered to and allows the required permissible starting value for a to be calculated for (7)
$$\text{(a) } a_z = a_0(1 - x_{sz}) = U_1 s(1 - x_{sz}) + v_p k_1 (1 - x_{sz})$$
$$\text{(b) } x_{sz} = \begin{cases} w, & w > 0 \\ 0, & w \le 0 \end{cases}$$
$$\text{(c) } w = \max_i \left\{ 1 - \frac{f_i - \varepsilon}{a_{0i}} \right\}$$

$\varepsilon$ here represents a first, for example, infinitesimal, distance.

All subsequent considerations relate to the expanded system (6), wherein however the original description pursuant to (1) is maintained for reasons of simplicity.

To resolve the LOP a second procedural step now follows, namely an optimization of the efficiency criterion (1c) and/or (6d), which is performed iteratively as follows:

$$\text{(a) } a_{i+1} = a_i - D_i U_2^{(i)} U_2^{(i)T} D_i g \cdot k$$
$$= a_i - v_{gi} \circ k$$

In this $v_{gi}$ represents the iteration gradient, which is scaled in every iteration step, i.e., in each iteration step the gradient direction is newly determined. Moreover, k represents a limiting factor for the iteration step width, which is determined as follows:

(8)
$$\text{(b) } k = \min(k_u, k_0)(1 - \varepsilon)$$
$$\text{(c) } k_0 = \min_{v_{gi}^{(j)} < 0} \left( \frac{a_i^{(j)} - f_j}{v_{gi}^{(j)}} \right); k_u = \min_{v_{gi}^{(j)} > 0} \left( \frac{a_i^{(j)}}{v_{gi}^{(j)}} \right)$$

This selection of k while taking the boundary value condition $0 \le a \le f$ into account ensures that $a_{i+1}$ remains permissible.

$$\text{(d) } D_i = \text{diag}\left[ a_i^{(j)}\left(1 - \frac{a_i^{(j)}}{f_j}\right) \right], j = 1, \ldots, n+1$$

(e) $U_2^{(i)}$: zero space vectors of $T_c D_i = V^{(i)} \Sigma^{(i)} U_1^{(i)T}$ $a_1 = a_z$, calculated pursuant to (7).

The essential idea in (8) is the constant scaling of the problem with $D_i$ and the subsequent continuation into the thus modified, on $U_2^{(i)}$ projected, negative gradient direction, wherein, due to the familiar structure of the problem as a convex linear optimization problem with an optimal solution on the boundary, it is guaranteed that the efficiency criterion is reduced in every iteration step. The iteration is preferably interrupted when the amount of $v_{gi} \cdot k$ drops below a specified threshold as a second distance, i.e., $a_i$ hardly changes any more.

A particular expansion of the present method as compared with the method in Karmakar consists in taking an additional boundary value problem into account with every iteration step, here the inclusion of the upper bound f (upper bound problem) by adding the second factor in $D_i$ and taking the upper bound f into consideration within the framework of the term $k_0$ in the calculation of k pursuant to (8b). Up to now, in the Karmakar methods usually complex expansions of the linear optimization problem with slack variables were offered with the disadvantage that the dimension of the problem that needs to be solved is increased considerably. Here the present method represents an essential simplification. Additionally it eliminates the very complex determination of a permissible solution in the initialization phase, as practiced in Karmakar, through the suggested initialization phase, which is better adapted to the present problem.

Another advantageous procedural step of the method described here is thus in the constant calculation of $v_{gi}$, which preferably occurs not through the SVD of $T_c D_i$, but due to (here we use the following simplified depiction: $T_c$ for $T_c D_i$, D for $D_i$)

(9)
$$\text{(a) } M = T_c T_c^T = V \Sigma^2 V^T$$
$$\rightarrow$$
$$\text{(b) } U_1 U_1^T = T_c^T M^{-1} T_c$$
$$v_g = D U_2 U_2^T D_g = D(I - U_1 U_1^T) D_g$$
$$\text{(c) } \qquad = D(I - T_c^T M^{-1} T_c) b$$
$$\qquad = D(b - T_c^T x)$$
with
$$\text{(d) } \qquad Mx = T_c b$$

via the solution from (9d) for x by means of a Gauss elimination. This method is clearly faster than an SVD. For $a_0$ as well, $U_1$ is not determined, but $U_{1s}$ is calculated directly pursuant to $$U_{1s} = U_1 \Sigma^{-1} V^T r = T_c^T M^{-1} r \qquad (e)$$

Thus the method consists in the execution of the calculation steps equation (5) with (9e)  } initialization
equation (7)

equation (8) with (9c, d)  } iteration

Finally additional advantages of the suggested method compared with a simplex method pursuant to the state of the art are summarized in the following:

- a calculation of a permissible solution can occur with minimal effort (even $a_z$ could already be used as a thruster selection, although it would not be fuel-optimized),
- the subsequent optimization can be limited to a few steps if necessary when, e.g., the power of the on-board computer is limited,
- experience shows that the optimum on average is achieved with considerably fewer arithmetic operations and generally requires less memory than with a simplex method,
- in the case of a thruster failure, $T_c$ must be reduced only by the appropriate column, and an appropriate vector $v_p$ must be stored, i.e., in this case only minimal additional memory is required, in contrast to the state of the art,
- by including the upper bound problem in practice problems are avoided especially with limited thruster adjusting capacity.

The invention claimed is:

1. A method for selecting a solution to a linear optimization problem for fuel-optimized selection of a configuration of thrusters on a spacecraft comprising:
    finding a first permissible calculation of said solution in an initialization phase; and
    performing an iterative optimization of an effectiveness criterion in a subsequent iteration phase, said subsequent iteration phase having at least one iteration and providing a subsequent permissible calculation of said solution;
    wherein a scaled iteration gradient is formed with said at least one iteration, and
    wherein said scaled iteration gradient is multiplied with a limiting factor for a maximum iteration interval width, said maximum iteration interval width being formed while taking at least one boundary value condition for said subsequent permissible solution into account.

2. The method of claim 1, wherein an upper bound for said at least one boundary value condition is defined.

3. The method of claim 1, wherein said scaled iteration gradient is determined by a Gauss elimination.

4. The method of claim 1, wherein a gradient component of said scaled iteration gradient becomes smaller in a current iteration of said at least one iteration as an appropriate component of said subsequent permissible solution comes closer to one of said at least one boundary value condition in a previous iteration of said at least one iteration.

5. The method of claim 1, wherein said subsequent iteration phase is terminated after a current iteration of said at least one iteration when an appropriate component of said subsequent permissible solution exceeds one of said at least one boundary value condition, and wherein a result of a previous of at least one iteration is determined as an optimal solution of said effectiveness criterion.

6. The method of claim 1, wherein said subsequent iteration phase is terminated after a current iteration of said at least one iteration when a current result of said effectiveness criterion differs from a previous result of said effectiveness criterion in a previous of said at least one iteration by less than a pre-defined distance, and wherein said previous result is determined as an optimal solution of said effectiveness criterion.

7. A method for selecting a solution to a linear optimization problem for fuel-optimized selection of a configuration of thrusters on a spacecraft comprising:
    producing an initial result of said solution; and
    calculating, in at least one iteration, a subsequent result of said solution by optimization of an efficiency criterion.

8. The method of claim 7, wherein a scaled iteration gradient is formed in said at least one iteration.

9. The method of claim 8, wherein said scaled iteration gradient is multiplied with a limiting factor for a maximum iteration interval width, said maximum iteration interval width being formed while taking into account at least one boundary value condition for said subsequent result of said solution.

10. The method of claim 9, wherein said at least one boundary value condition comprises an upper bound.

11. The method of claim 9, wherein said scaled iteration gradient is determined by a Gauss elimination.

12. The method of claim 9, wherein a gradient component of said scaled iteration gradient becomes smaller in a current iteration of said at least one iteration as an appropriate component of said subsequent result of said solution comes closer to one of said at least one boundary value condition in a previous iteration of said at least one iteration.

13. The method of claim 9, wherein said calculating is terminated after a current iteration of said at least one iteration when an appropriate component of said subsequent result of said solution exceeds one of said at least one boundary value condition, and wherein a result of a previous iteration of at least one iteration is determined as an optimal solution of said effectiveness criterion.

14. The method of claim 9, wherein said calculating is terminated in after a current iteration of said at least one iteration when a current result of said effectiveness criterion differs from a previous result of said effectiveness criterion, said previous resulted generated in a previous iteration of said at least one iteration, by less than a pre-defined distance, and wherein said previous result is determined as an optimal solution of said effectiveness criterion.

15. The method of claim 10, wherein a gradient component of said scaled iteration gradient becomes smaller in a current iteration of said at least one iteration as an appropriate component of said subsequent result of said solution comes closer to one of said at least one boundary value condition in a previous iteration of said at least one iteration.

16. The method of claim 10, wherein said calculating is terminated after a current iteration of said at least one iteration when an appropriate component of said subsequent result of said solution exceeds one of said at least one boundary value condition, and wherein a result of a previous iteration of at least one iteration is determined as an optimal solution of said effectiveness criterion.

17. The method of claim 10, wherein said calculating is terminated after a current iteration of said at least one iteration when a current result of said effectiveness criterion differs from a previous result of said effectiveness criterion, said previous resulted generated in a previous iteration of said at least one iteration, by less than a pre-defined distance, and wherein said previous result is determined as an optimal solution of the effectiveness criterion.

18. The method of claim 11, wherein a gradient component of said scaled iteration gradient becomes smaller in a current iteration of said at least one iteration as an appropriate component of said subsequent result of said solution comes closer to one of said at least one boundary value condition in a previous iteration of said at least one iteration.

19. The method of claim 11, wherein said calculating is terminated after a current iteration of said at least one iteration when an appropriate component of said subsequent result of said solution exceeds one of said at least one boundary value condition, and wherein a result of a previous iteration of at least one iteration is determined as an optimal solution of said effectiveness criterion.

20. The method of claim 11, wherein said calculating is terminated in after a current iteration of said at least one iteration when a current result of said effectiveness criterion differs from a previous result of said effectiveness criterion, said previous resulted generated in a previous iteration of said at least one iteration, by less than a pre-defined distance, and wherein said previous result is determined as an optimal solution of said effectiveness criterion.

21. A method for selecting a solution to a linear optimization problem for fuel-optimized selection of a configuration of thrusters on a spacecraft comprising:
    finding a first permissible calculation of said solution in an initialization phase;
    performing an iterative optimization of an effectiveness criterion in a subsequent iteration phase, said subsequent iteration phase having at least one iteration and providing a subsequent permissible calculation of said solution; and using said solution to carry out said fuel-optimized selection of said configuration of thrusters on said spacecraft;

wherein a scaled iteration gradient is formed with said at least one iteration, and wherein said scaled iteration gradient is multiplied with a limiting factor for a maximum iteration interval width, said maximum iteration interval width being formed while taking at least one boundary value condition for said subsequent permissible solution into account.

22. A method for selecting a solution to a linear optimization problem for fuel-optimized selection of a configuration of thrusters on a spacecraft comprising:

producing an initial result of said solution;

calculating, in at least one iteration, a subsequent result of said solution by optimization of an efficiency criterion; and using said solution to carry out said fuel-optimized selection of said configuration of thrusters on said spacecraft.

23. An apparatus for selecting a solution to a linear optimization problem for fuel-optimized selection of a configuration of thrusters on a spacecraft comprising:

means for finding a first permissible calculation of said solution in an initialization phase; and means for performing an iterative optimization of an effectiveness criterion in a subsequent iteration phase, said subsequent iteration phase having at least one iteration and providing a subsequent permissible calculation of said solution;

wherein a scaled iteration gradient is formed with said at least one iteration, and wherein said scaled iteration gradient is multiplied with a limiting factor for a maximum iteration interval width, said maximum iteration interval width being formed while taking at least one boundary value condition for said subsequent permissible solution into account.

24. A system for selecting a solution to a linear optimization problem for fuel-optimized selection of a configuration of thrusters on a spacecraft comprising:

means for producing an initial result of said solution; and means for calculating, in at least one iteration, a subsequent result of said solution by optimization of an efficiency criterion.

* * * * *